Figure 5:
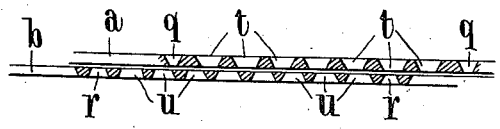

C. A. PARSONS & S. S. COOK.
MEANS FOR SYNCHRONIZING REVOLVING BODIES.
APPLICATION FILED APR. 4, 1914.
1,194,222.
Patented Aug. 8, 1916.
6 SHEETS—SHEET 1.
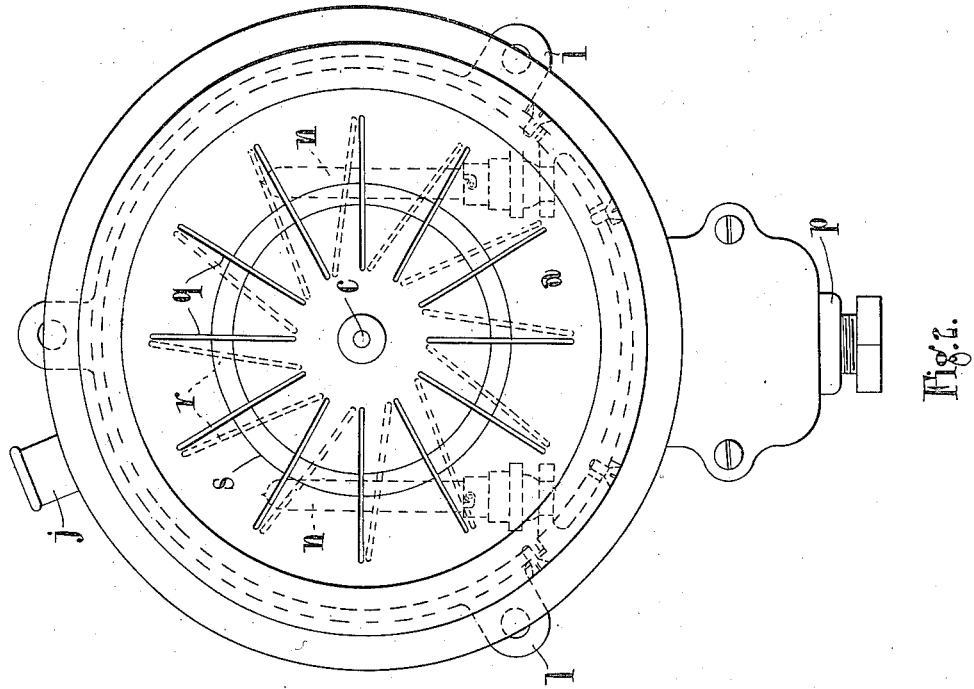
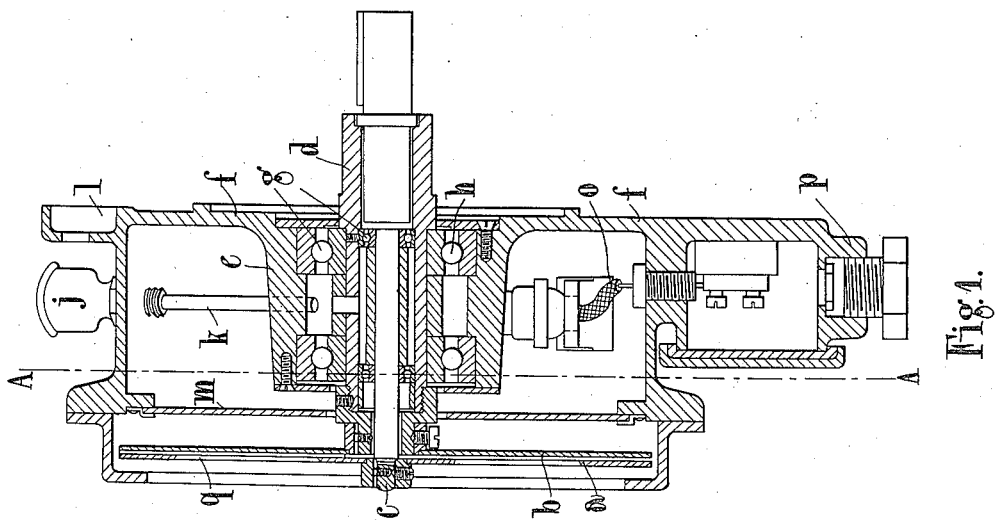
WITNESSES:
Ewd L Tolson
H. L. Alden
INVENTORS:
Charles A. Parsons &
Stanley S. Cook
BY Spear Middleton Donaldson Spear
ATTORNEYS C. A. PARSONS & S. S. COOK.
MEANS FOR SYNCHRONIZING REVOLVING BODIES.
APPLICATION FILED APR. 4, 1914.

1,194,222.

Patented Aug. 8, 1916.
6 SHEETS—SHEET 2.

WITNESSES:
Ewd L. Tolson
H. L. Alden

INVENTORS:
Charles A. Parsons,
Stanley S. Cook,
BY
ATTORNEYS

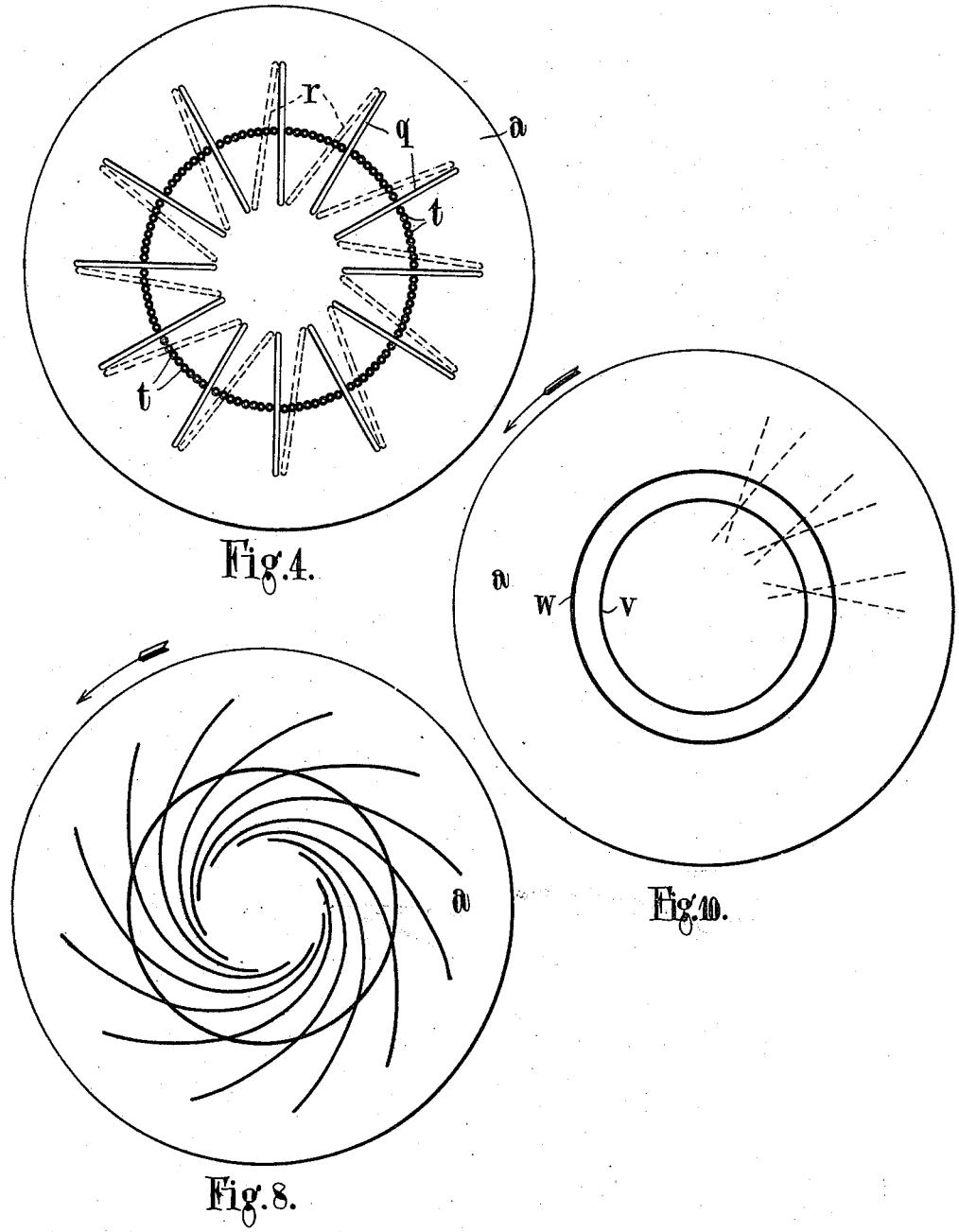

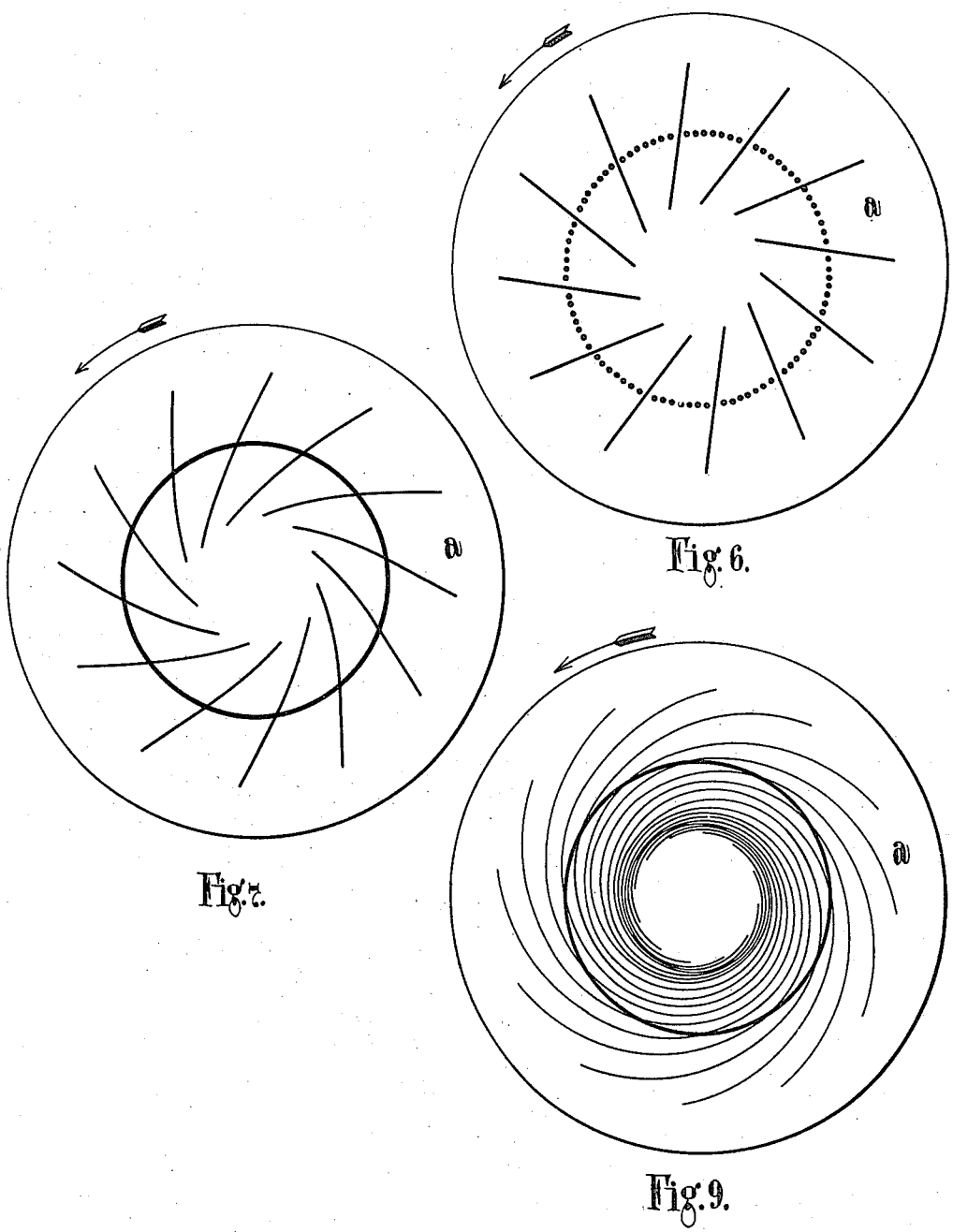

C. A. PARSONS & S. S. COOK.
MEANS FOR SYNCHRONIZING REVOLVING BODIES.
APPLICATION FILED APR. 4, 1914.

C. A. PARSONS & S. S. COOK.
MEANS FOR SYNCHRONIZING REVOLVING BODIES.
APPLICATION FILED APR. 4, 1914.

1,194,222.

Patented Aug. 8, 1916.
6 SHEETS—SHEET 6.

WITNESSES:
Ewd L. Tolson
H. L. Alden

INVENTORS,
Charles A. Parsons &
BY Stanley S. Cook,
Spear Middleton
ATTORNEYS

UNITED STATES PATENT OFFICE.

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

MEANS FOR SYNCHRONIZING REVOLVING BODIES.

1,194,222.   Specification of Letters Patent.   Patented Aug. 8, 1916.

Application filed April 4, 1914.   Serial No. 829,688.

*To all whom it may concern:*

Be it known that we, CHARLES ALGERNON PARSONS, K. C. B., of Heaton Works, Newcastle-upon-Tyne, in the county of Northumberland, England, and STANLEY SMITH COOK, of Turbinia Works, Wallsend-on-Tyne, in the county of Northumberland, England, subjects of the King of Great Britain and Ireland, have invented certain new and useful Improvements in and Relating to Means for Synchronizing Revolving Bodies, of which the following is a specification.

The present invention relates to improvements in stroboscopic means suitable for synchronizing two revolving bodies such as shafts. If, for instance, two shafts in line are to be connected by couplings of the claw type when rotating at high or even moderate speed, it is necessary for them to be brought to substantially the same speed in order that the engagement may be made without shock and without damage to the claws.

The object of the invention is to provide simple indicating apparatus under the guidance of which the operators may bring the shafts to a common speed and into the correct phase relation to throw the coupling into engagement without shock.

The invention consists in a stroboscope comprising two adjacent disks mounted concentrically and driven respectively from the bodies to be synchronized and both of which are provided with suitably arranged apertures through which strong light is adapted to shine from a suitable source, the speed, order and position of the flashes from which indicate the relative motion and relative position of the bodies from which the disks are driven.

The invention also consists in a stroboscope in which one of the disks is provided with elongated radial apertures or a series of holes in radial lines while the other disk is provided with elongated oblique apertures or rows of holes positioned obliquely, the disks being geared to the rotating bodies in the same ratios so that the flashes move outward or inward according to which shaft is the faster means being provided at a given radial distance from the center of the disk to indicate when the phases of the bodies are the same.

The invention further consists in the improved stroboscopic means hereinafter indicated.

In carrying the present invention into effect according to one form as applied, for instance, to two co-axial shafts carrying claw couplings rotating at a high speed, there is provided a pair of adjacent and concentric disks.

The disks may be driven from the rotating shafts by any suitable positive transmission device and may be so arranged that the disks are situated in a convenient position for observation.

The disks are provided with suitably arranged apertures through which a strong light is caused to shine from the side remote from the observer. It is not necessary that the light should illuminate the whole of the disk—it is sufficient for a segmental portion to be illuminated.

The light observed from the front of the disks is intermittently obscured and by the speed order and position of the flashes thus observed the relative motion and phase of the shafts will be indicated.

According to one form, the disks are rotated at the same speeds as the shafts, for instance, by means of chains running over equal sprocket wheels and the number of apertures in the disks are the same as the number of claws in the coupling, and arranged in concentric circles of equal diameter on the two disks.

The apertures may be elongated in radial or oblique lines or consists of series of holes in such lines. For example, the holes in one disk may be elongated radially and those in the other disk obliquely or obliquely in both, but in the latter case the inclinations to the radial in the two disks being respectively at different angles to radial lines, and if both the disks are geared to their shafts in the same ratio the flash will move outward or inward according to which is the faster, and engagement of the clutch may be safely made when the flash is practically stationary at a given distance from the center of rotation of the disk. Suitable means may be provided to indicate the correct radial position of the flash for safe engagement of the clutch.

It is not necessary that the two disks be geared to their respective shafts in the same ratio, if the number of apertures be inversely proportional to the ratio of the revolutions of the disk to that of the shaft.

It will be seen that the positions indicated in which the shafts may be clutched may be any number, depending upon the number of apertures in the disks and the ratio of the speed of the disks to that of the shafts.

According to a modification, the circumferential pitch of the apertures is not uniform, or a different number of uniformly pitched apertures is provided in the two disks so that only one or two clutching positions are indicated for each revolution of the two disks. This modification is useful in places where a small number of clutching positions is required for each relative revolution of the bodies to be coupled, while great sensitiveness in indicating their relative angular position is desirable. It will be seen that if two shafts revolving in opposite directions are to be synchronized, it is necessary to gear one disk to run in the opposite direction to the body to which it is geared so that both the disks revolve in the same direction. This method of application is useful in the case where two gear wheels mounted upon parallel non-coaxial shafts are to be put into gear while running in which case it is necessary to gear the disks to the shafts in ratios depending upon the number of teeth in either wheel.

Figure 3:
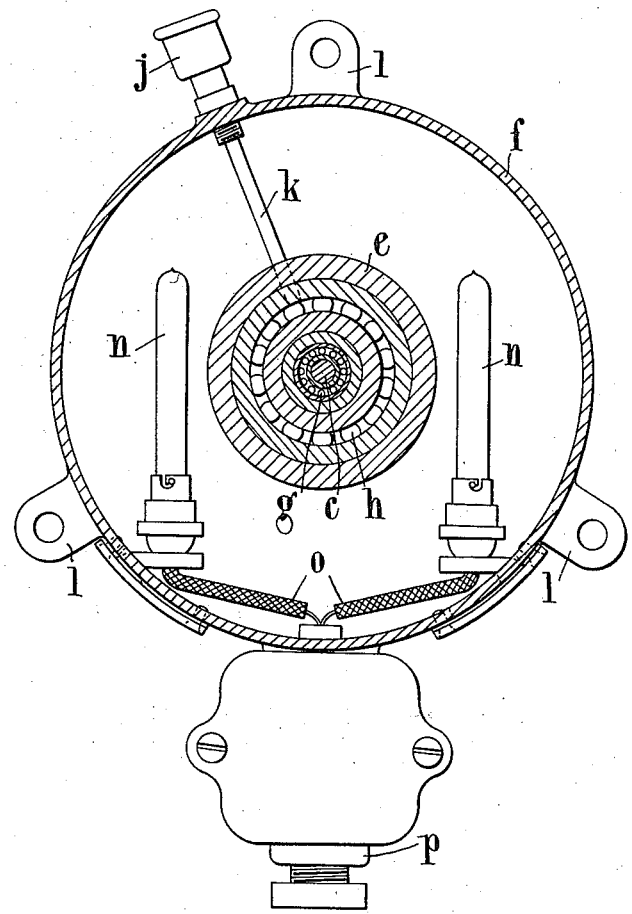
Figure 16:
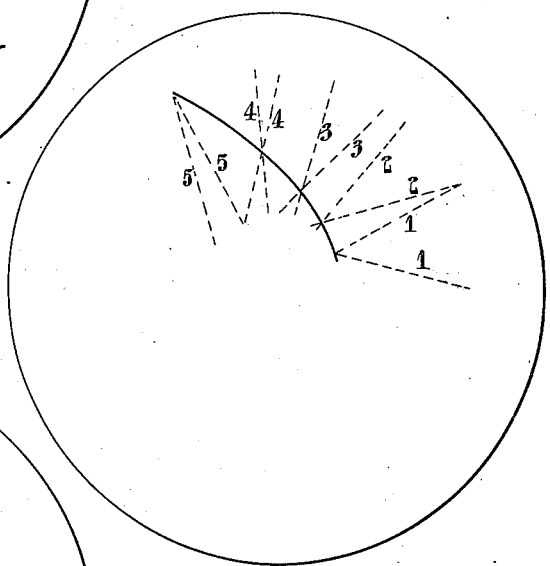

Referring to the accompanying drawings:—Figure 1 is a cross-sectional side elevation through a stroboscope according to the present invention. Fig. 2 is a front elevation of Fig. 1. Fig. 3 is a sectional front elevation on the line A—A of Fig. 1. Fig. 4 illustrates a modified form of reference ring. Fig. 5 is a section through the disks $a$ $b$ of Fig. 4 along the common pitch line of the holes $t$ and $u$. Fig. 6 illustrates the optical effect produced when disk $b$ is stationary and the disk $a$ rotates in the direction of the arrow. Fig. 7 shows the effect produced when the disk $b$ commences to rotate slowly, the disk $a$ rotating at the same speed as in Fig. 6. In Fig. 8 the speed of the disk $b$ more nearly approaches the speed of the disk $a$. In Fig. 9 the speed of $b$ approaches still nearer the speed of $a$. While Fig. 10 shows the optical effect produced when the disks are rotating at the same speed but not in the proper relative angular positions for clutching. Figs. 11, 12, 13 and 14 show the optical effects produced by gradually reducing the speed of the front disk $a$, keeping the speed of the rear disk $b$ constant. Fig. 15 shows the development of the apparent flashes illustrated in Figs. 7, 8 and 9, while Fig. 16 shows the development of the apparent flashes illustrated in Figs. 11, 12 and 13.

In carrying the present invention into effect according to one form and as illustrated in Figs. 1, 2 and 3 as suitable, for instance, for the synchronizing of two co-axial shafts rotating at a high speed and carrying claw couplings which require to be relatively positioned there is provided a pair of adjacent and concentric disks $a$ and $b$. The disks are mounted upon shafts $c$ and $d$ respectively, the bearings for which are carried in a housing $e$, forming part of the casing $f$, which also incloses the disks $a$ and $b$. The shafts $c$ and $d$ are preferably mounted on ball bearings $g$ and $h$, which are lubricated from the grease cup $j$ by the pipe $k$. The casing $f$ may be provided with lugs $l$, to enable the device to be set up in a convenient position for observation. Within the casing $f$ and behind the disks, there is provided a glass disk $m$, behind this disk and within the casing suitably shaped electric or other lamps $n$ are provided, the leads O for which pass out of the casing, by way of the fitting $p$. The disks are provided in the present modification with a suitable number of slots $q$ and $r$, the slots $q$ in the disk $a$ are in this modification radial while the slots $r$ in the disk $b$ are inclined. Upon the face of the disk $a$, a white or colored band $s$ is provided, which serves to indicate when the flashes occur only within its width, that the shafts are at the same speed, and in the correct relative angular position. As an alternative to the band $s$, a ring of holes $t$ and $u$ may be provided in the two disks at a suitable radius as shown in Figs. 4 and 5, so that a ring of light is seen when the two disks are revolving, and in this modification the coincidence of this ring of light and the ring of light made by the intersection of the slots, indicates the correct clutching position.

Figure 14:
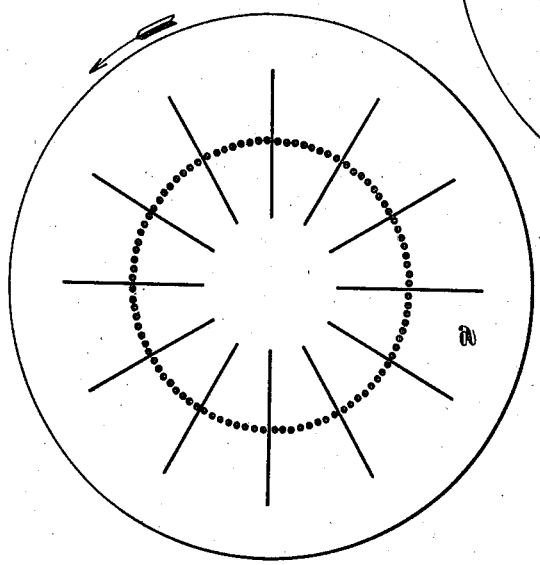
Figure 15:
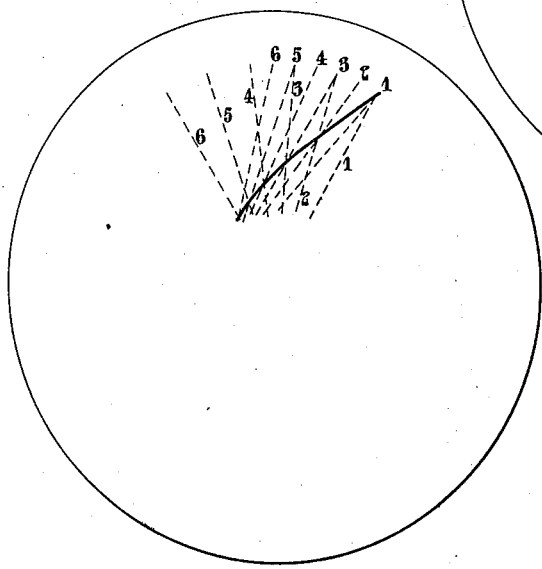

Referring to Figs. 6 and 14, the action of the apparatus at a different speed will be appreciated, the black lines within the circumscribing line representing apparent lines of light. In Fig. 6 the optical effect is shown, which is produced by revolving the outer disk $a$ rapidly while the inner disk $b$ is stationary.

Fig. 7 shows the effect produced when the outer disk is revolving rapidly, and the inner disk relatively slowly. In Fig. 8 the speed of the disk $b$ has been brought more nearly equal to that of $a$, while Fig. 9 the speed of $b$ is still nearer to that of $a$.

In Fig. 10, the speeds of the two disks $a$ and $b$ are equal, and a ring of light $v$ is produced from the lamps in shining through the intersection of the slots $q$ and $r$. The position of this ring of light indicates that although the disks are revolving at the same speed, they are not in the correct angular position for clutching, and shows that a slight angular advance of the inner disk $b$ will cause the intersection of the slots $q$ and $r$ to move rapidly outward consequently, if this slight angular advance of the disk $b$, is caused to take place, the ring $v$ will expand and will be in the correct position for clutching when coincident with the reference ring of light $w$, provided either by flashes of light through the holes $t$ and $u$, or by the colored band $s$. It is to be noted that when the disk $a$ is traveling faster than the disk $b$ in the direction shown by the arrows, the intersection of the slots moves radially inward and consequently the ring of light $v$ contracts in size until it disappears at the smallest radius, subsequently reappearing at the largest radius; and that when the disk $b$ is revolving at a greater speed than the disk $a$ the reverse effect is produced and the ring $v$ expands.

Referring to Figs. 11 to 14, these show the effects produced at several stages of the operation of gradually reducing the speed of the outer disk $a$ from the condition of equal speeds of the two disks, keeping the speed of the inner disk $b$ constant. It will be seen that the lines of light are nearly similar in shape, but of opposite hand to those produced by the reverse process as exemplified in Figs. 7, 8 and 9.

If the direction of rotation of the two disks is reversed, similar effects to those described will be produced, but of opposite hand.

In Figs. 6 and 14 the light is observed apparently shining through the whole of each aperture of the stationary disk, as though the other disk were removed. This is due to the circumstance that while the light only passes through the intersection of the apertures of the two disks at any instant, this intersection moves along the whole length of the apertures of the stationary disk in such a short space of time, that the eye retains the whole of this impression during this interval, owing to the persistance of vision.

Figure 11:
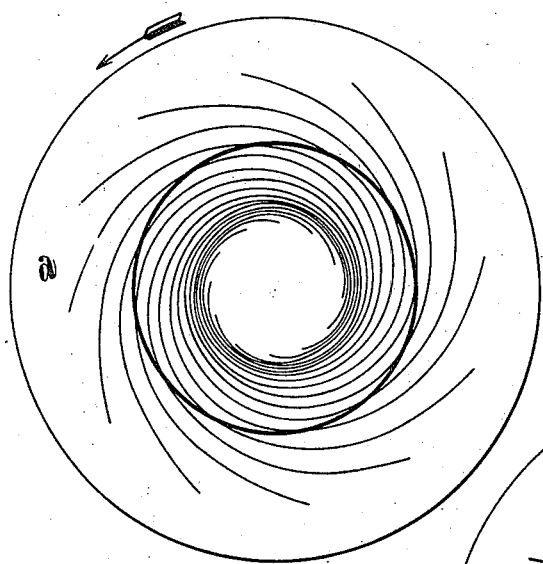
Figure 13:
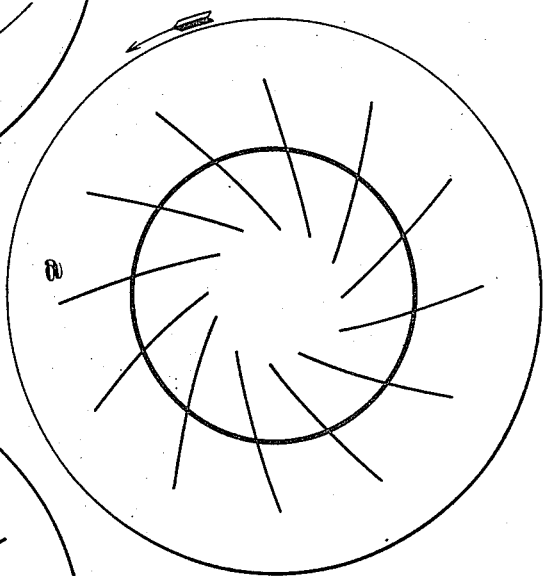
Figure 12:
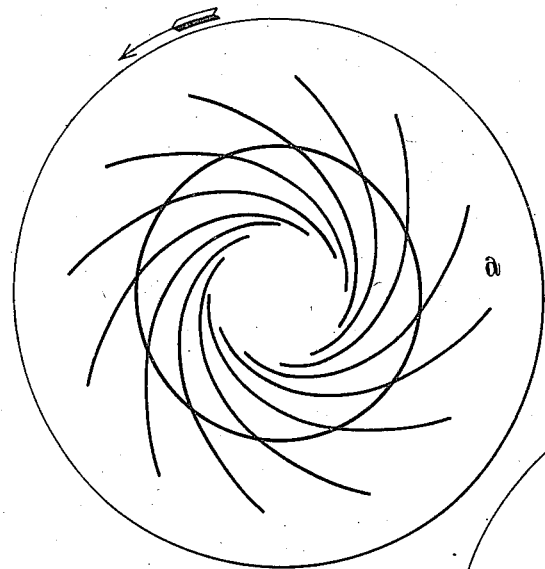

Fig. 15 shows the development of the apparent flashes in Figs. 7, 8 and 9, and Fig. 16 shows the development of those shown in Figs. 11, 12 and 13. It will be seen that the flash through the intersection of the apertures of the two disks has a circumferential movement owing to the rotation of the disks, and a radial movement due to their relative rotation. As in the case of Figs. 6 and 14, the flash traverses its path so rapidly in the development of these lines, that the eye retains the impression of the whole of the flash during their development, and continuous spiral lines are seen.

It will be seen that apparatus such as described possesses the advantage of great simplicity and can be placed so as to be observed from any convenient point for manipulating the clutch or regulating the speed of the shafts.

Although described with reference to the synchronizing of rotating shafts, it is to be understood that the present invention is applicable to the synchronizing or to the maintenance of definite speed ratios between any rotating bodies.

Having now fully described and ascertained our said invention and the manner in which it is to be performed, we declare that what we claim is:—

1. Means for determining the relative angular velocity and phase of two revolving bodies comprising two co-axial disks provided with elongated apertures and rotated in the same direction, ecah by one of the bodies, the said apertures in the respective disks being relatively inclined, making different angles to the radial direction in the two disks, in combination with a source of light on one side of said disks, and so arranged that light can pass through the intersections of the said apertures.

2. In means for determining the relative angular velocity and phase of two revolving bodies, in combination, two rotatable adjacent co-axial disks, radial slots in one of said disks, slots in the other of said disks, inclined to the radial direction, and means for causing light to pass through the intersections of said slots.

3. In means for determining the relative angular velocity and phase of two revolving bodies, in combination, two co-axial rotatable elements in proximity, elongated apertures in said elements, said apertures being so positioned in the respective disks that they intersect upon rotation of the elements, and means to cause light to pass through the intersection of said apertures.

4. In means for determining the relative angular velocity and phase of two revolving bodies, in combination, two rotatable co-axial elements, means in said elements to permit light to pass, said means being adapted to progressively intersect on relative rotation of the elements, and means to cause light to pass through said intersections.

5. In means for determining the relative angular velocity and phase of two revolving bodies, in combination, a hollow shaft, bearings to support said shaft, a disk upon said shaft, a second shaft mounted in bearings within said hollow shaft, a second disk upon said second shaft, elongated apertures in each of said disks, the apertures being inclined at different angles to the radial direction in the respective disks, means adapted to cause light to pass through the intersections of said apertures, and means to rotate each of the disks respectively by one of the said bodies.

6. In means for determining the relative angular velocity and phase of two revolving bodies, in combination, a casing, bearings in said casing, a hollow shaft rotatably supported in said bearings, a disk upon said shaft, a second shaft mounted in bearings within said hollow shaft, a second disk upon said second shaft, elongated apertures in each of said disks, the apertures being inclined at different angles to the radial direction in the respective disks, means adapted to cause light to pass through the intersections of said apertures, and means to rotate each of the disks respectively by one of the said bodies.

7. In means for determining the relative angular velocity and phase of two revolving bodies, in combination, a shaft, bearings to support said shaft, a disk upon said shaft, a second shaft co-axial with said first mentioned shaft, bearings to support said second shaft, a second disk upon said second shaft, elongated apertures in each of said disks, the apertures in the respective disks being relatively inclined, means adapted to cause light to pass through the intersections of said apertures, and means to rotate each of the disks relatively by one of the said bodies.

In testimony whereof we have signed our names to this specification in the presence of two subscribing witnesses.

CHARLES ALGERNON PARSONS.
STANLEY SMITH COOK.

Witnesses to the signature of Charles A. Parsons:
BERTRAM H. MATTHEWS,
HENRY BORWICK.

Witnesses to the signature of Stanley Smith Cook:
FREDERICK GORDON HAY HIDFORD,
ALBERT WILLIAM PARR.